(12) United States Patent
Pearson

(10) Patent No.: US 6,555,989 B1
(45) Date of Patent: Apr. 29, 2003

(54) EFFICIENT LOAD-FOLLOWING POWER GENERATING SYSTEM

(75) Inventor: Martin T. Pearson, Burnaby (CA)

(73) Assignee: Ballard Power Systems Inc., Burnaby (CA)

( * ) Notice: Subject to any disclaimer, the term of this patent is extended or adjusted under 35 U.S.C. 154(b) by 0 days.

(21) Appl. No.: 09/995,259

(22) Filed: Nov. 27, 2001

(51) Int. Cl.[7] .................... H01M 10/44; H01M 10/46; H01M 8/00
(52) U.S. Cl. ........................... 320/101; 429/13
(58) Field of Search ................ 320/101, 107, 320/127, 128; 429/12, 13, 15, 17, 21

(56) References Cited

U.S. PATENT DOCUMENTS

| | | | |
|---|---|---|---|
| 4,056,764 A | | 11/1977 | Endo et al. |
| 4,184,197 A | | 1/1980 | Cuk et al. |
| 4,650,727 A | * | 3/1987 | Vanderborgh et al. |
| 4,778,579 A | | 10/1988 | Levy et al. |
| 4,883,724 A | | 11/1989 | Yamamoto |
| 5,314,762 A | * | 5/1994 | Hamada et al. |
| 5,360,679 A | * | 11/1994 | Buswell et al. |
| 5,401,589 A | * | 3/1995 | Palmer et al. |
| 5,637,414 A | | 6/1997 | Inoue et al. |
| 6,158,537 A | | 12/2000 | Nonobe |
| 6,163,131 A | * | 12/2000 | Gartstein et al. |
| 6,198,250 B1 | | 3/2001 | Gartstein et al. |

FOREIGN PATENT DOCUMENTS

| | | |
|---|---|---|
| DE | DE10065446 A1 | 7/2001 |
| JP | 63-98712 | 4/1988 |
| JP | 2-291668 | 12/1990 |
| JP | 7-105965 | 4/1995 |

OTHER PUBLICATIONS

Abstract of DE10065446A1, espacenet database, Jul. 12, 2001.
Abstract of JP 07–105965, espacenet database, Apr. 21, 1995.
Abstract of JP 02–291668, espacenet database, Dec. 3, 1990.
Abstract of JP 63–98712, espacenet database, Apr. 30, 1988.

* cited by examiner

Primary Examiner—Edward Tso
(74) Attorney, Agent, or Firm—Seed IP Law Group PLLC

(57) ABSTRACT

A power generating system which comprises a fuel cell and a rechargeable storage battery coupled together via a DC-DC converter. A reactant for the fuel cell is obtained by processing a suitable raw material. The processor is controlled on the basis of the current demanded by the external load and by the storage battery, and the fuel cell current drawn by the DC-DC converter is controlled on the basis of the amount of reactant available from the processor.

22 Claims, 1 Drawing Sheet

EFFICIENT LOAD-FOLLOWING POWER GENERATING SYSTEM

BACKGROUND OF THE INVENTION

1. Field of the Invention

The present invention relates to a load-following hybrid power generating system comprising a fuel cell and a rechargeable storage battery coupled together via a DC-DC converter in which a reactant raw material is processed before the reactant is supplied to the fuel cell.

2. Description of the Related Art

In applications where electricity demand may vary rapidly over time, fuel cell based power generating systems are typically configured as hybrid systems, comprising both a fuel cell power supply and a load levelling power supply such as a rechargeable storage battery. Such a hybrid system is desired if the response time of the fuel cell side of the system is not fast enough to accommodate sudden increases in power demand. In that case, sudden increases in power demand are met by power delivered from the storage battery. With time, the fuel cell side of the system responds to meet the demand and the storage battery is then recharged appropriately using power from the fuel cell. An example of a system where electricity demand may vary rapidly over time is an uninterruptible power supply (UPS) that is designed to back up another power supply without interruption during power outages.

Depending on the power requirements of the applied external load, the generating system power outputs may simply be connected across the storage battery, or instead the system may contain a power conditioning system between the storage battery and the system power outputs. For instance, an inverter may be used to convert DC power from the storage battery into AC. In the generating system, the fuel cell is also electrically connected to the storage battery. However, since the voltage characteristics of the fuel cell and storage battery differ during operation, the typical hybrid system employs a DC-DC converter to couple the fuel cell and the storage battery together (the fuel cell and the battery being electrically connected across the inputs and outputs of the DC-DC converter respectively). In this way, DC current produced by the fuel cell at the fuel cell voltage may be converted to DC current at an appropriate voltage for the storage battery and for the applied external load. The generating system employs some means for determining the power required to supply the external load and to appropriately recharge the storage battery, and uses this information to control the power produced by the fuel cell. For instance, a desired current output from the DC-DC converter may be determined and this information used to control the reactant supplies to the fuel cell and to control the DC-DC converter such that the DC-DC converter applies an appropriate load to the fuel cell.

In providing reactants for the fuel cell, the generating system may also include certain reactant processors that convert raw materials into reactants suitable for the fuel cell. For instance, hybrid systems may include a reformer system that converts a supply of a hydrocarbon fuel (e.g., methane or methanol) into hydrogen reactant for the fuel cell. The amount of material processed by these processors would thus also be controlled in accordance with the power required by the external load and the storage battery. However, for processors like reformer systems, there can be a significant time lag between signaling for a change in the rate of processed reactant and actually obtaining the desired rate of processed reactant. Thus, for a period, the DC-DC converter may draw more or less current from the fuel cell than would be desired on the basis of the actual reactant supplies available to the fuel cell. That is, when the current drawn by the DC-DC converter suddenly increases, the fuel cell may operate at an undesirably high overvoltage for some time until more processed reactant is available. Producing power under such starved operating conditions is inefficient and, in the extreme, may possibly result in damage to the fuel cell. Conversely, when the current drawn by the DC-DC converter suddenly decreases, more reactant is supplied to the fuel cell than is needed for the current drawn. Thus, reactant may go unconsumed, which is also inefficient.

Unpredictable variations in power demand thus pose challenges in controlling such systems such that the demand for electricity is met while still operating efficiently.

BRIEF SUMMARY OF THE INVENTION

The present invention relates to an improved fuel cell/storage battery hybrid power generating system wherein a reactant processor is controlled on the basis of the determined current requirements of the external load and of the storage battery, and wherein the current drawn from the fuel cell by the DC-DC converter is controlled on the basis of the amount of processed reactant that is actually available from the processor.

The improved power generating system includes a fuel cell, a reactant processor for processing a reactant raw material into one or more reactant streams for the fuel cell, a DC-DC current converter, a rechargeable storage battery, a current determiner for determining a desired output current from the DC-DC current converter, and system power outputs for outputting power to an external load. The reactant processor has an inlet for receiving the reactant raw material and an outlet that is fluidly connected to the reactant inlet of the fuel cell. The fuel cell is electrically connected across the current inputs of the DC-DC current converter while the battery is electrically connected across the current outputs of the DC-DC current converter. An output signal from the current determiner is provided as a setpoint input to the reactant processor.

The improved system additionally comprises a rate determiner that is used in the control of the DC-DC converter. The rate determiner determines the rate that reactant is supplied from the reactant processor outlet and provides an output signal to a setpoint input of the DC-DC current converter. The current drawn from the fuel cell is controlled by adjusting the input impedance of the DC-DC current converter in accordance with the signal at the DC-DC current converter setpoint input. In particular, the input impedance may be adjusted such that the reactant is consumed in the fuel cell at a rate proportional to the rate that reactant is supplied from the processor. For purposes of controlling the DC-DC current converter, the system can also comprise a suitable means for measuring the actual current drawn from the fuel cell (e.g., an ammeter measuring the input current to the DC-DC current converter and providing a signal thereto). Circuitry within the converter can then compare the requested current drawn (represented by the setpoint input) to that actually drawn and adjust the input impedance of the converter appropriately.

The rate determiner can directly measure the rate that processed reactant is provided or can indirectly calculate it instead, based on other measured operation variables (e.g., the rate of hydrogen produced by a reformer may be deduced from the amount of methane supplied to the reformer and from the amount of unreformed methane present in the product reformate, as measured by a suitable methane concentration sensor, such as an infrared detector). The rate determiner thus can comprise, for instance, a reactant rate sensor (e.g., a flowmeter) in the fluid connection between the reactant processor outlet and the reactant inlet of the fuel cell. Alternatively, the rate determiner can comprise a computing unit for calculating the reactant rate supplied from the reactant processor.

The rate at which the reactant processor processes the reactant raw material is adjusted in accordance with the reactant processor setpoint input (i.e., the output signal from the current determiner). The current determiner in the system may comprise a load ammeter measuring current directed to the external load, a battery ammeter measuring current through the storage battery, a charge controller receiving an input signal from the battery ammeter, and a computing unit receiving input signals from the charge controller and the load ammeter and providing an output signal to a setpoint input of the reactant processor. The computing unit may sum input signals from the charge controller and the load ammeter and then output the sum as the output signal provided to the setpoint input of the reactant processor.

The system can also comprise a suitable means for measuring the output current from the DC-DC current converter (e.g., an ammeter) that then can be used to provide a feedback control signal to the reactant processor. Additionally, a signal from an ammeter measuring the current drawn from the fuel cell (i.e., the input current to the DC-DC current converter) may be desirably used as a control signal to the reactant processor. For instance, in the event that the fuel cell is unable to generate the requested current and the current drawn falls below a threshold value, it may be desirable to slow the reactant processing rate until the situation is corrected.

Under certain conditions, it may be desirable to deliberately interrupt the current drawn from the fuel cell (e.g., when a cell reversal or ground fault condition is detected). To accomplish this, the system may include a switch for interrupting current flow to the current inputs of the DC-DC current converter, and a fuel cell monitor connected to the fuel cell and controlling the switch.

In the improved power generating system, a preferred DC-DC current converter is a Cuk-type converter. Such converters advantageously can electrically isolate the fuel cell from the storage battery. Further, such converters are useful for obtaining reduced ripple in the output current.

An application for the improved power generating system is to serve as an uninterruptible power supply. AC power may be provided from the system by additionally incorporating an inverter therein with the current inputs and outputs of the inverter electrically connected across the storage battery and the system power outputs respectively.

The invention is also of benefit in systems in which the raw material for either the fuel or the oxidant is processed into a reactant (e.g., hydrogen or oxygen) for the fuel cell. In the case of the fuel, examples of reactant processors include a reformer system, a pressure swing adsorption system, or a pressure reducer (e.g., pressure regulating valve). In the case of the oxidant, examples of reactant processors include a compressor (e.g., turbo compressor, roots blower, water ring compressor) or a pressure swing adsorption system.

DETAILED DESCRIPTION OF THE INVENTION

Figure 1:
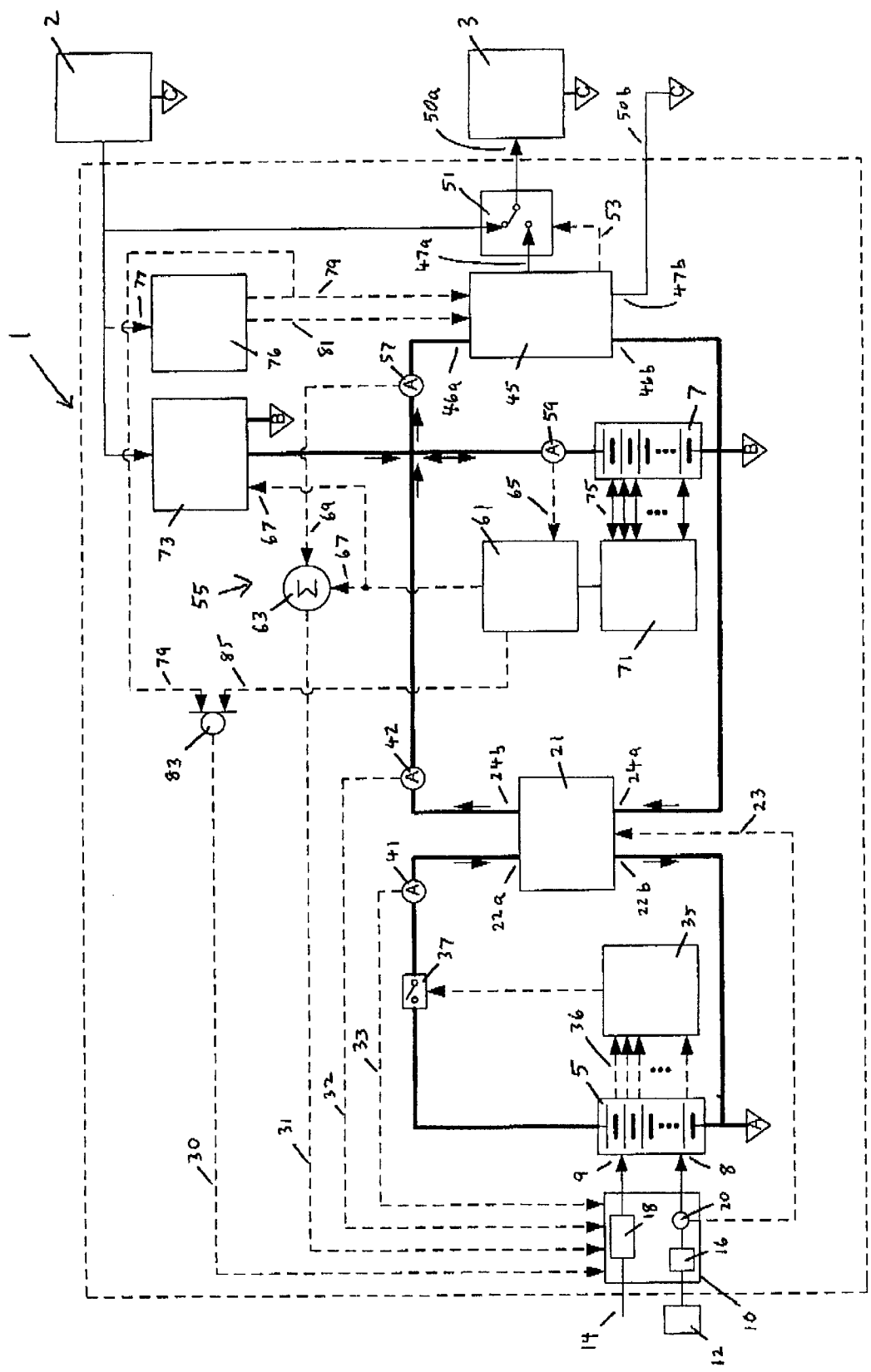
FIG. 1 is a schematic diagram of a load-following hybrid power generating system of the invention.

A schematic diagram of an uninterruptible power supply (UPS) 1 is shown in FIG. 1 that is suitable for backing up an AC main power source 2 which supplies electrical power to external load 3. The UPS is a load-following hybrid power generating system comprising fuel cell stack 5 and rechargeable storage battery 7 coupled together via DC-DC current converter 21. In this system, backup electrical power is primarily intended to be supplied by fuel cell stack 5 while storage battery 7 handles surges in power demand and serves as a load leveller for fuel cell stack 5. In FIG. 1, electrical control signals are indicated by dashed lines with arrows. Current flow direction is shown by solid arrows. Also, three different electrical grounds appear in FIG. 1. These are indicated by alphabetically labelled triangles A, B, and C and represent grounds for stack 5, battery 7, and the main system ground (for UPS 1, main power source 2 and external load 3), respectively.

Fuel cell stack 5 is supplied with fuel and oxidant reactants at reactant inlets 8 and 9 respectively. Frequently, reactants are not provided directly from stores of raw material but instead are processed in some manner first. For instance, fuel reactant may be obtained by reforming materials like methane or methanol into hydrogen gas. Alternatively, oxidant reactant may be obtained by pressurizing air. Generally, raw material supplies for either the fuel or oxidant may require purification, enrichment, pressure adjustment, or the like before being fed to fuel cell stack 5. A representative type of fuel cell stack 5 for use in UPS 1 is a solid polymer electrolyte (SPE) fuel cell stack. Typical fuel and oxidant reactants for a SPE fuel cell stack are pressurized hydrogen and air respectively. (Note that, although not shown, it is often desirable to recycle reactant exhausts from such fuel cells.)

FIG. 1 exemplifies one possible arrangement for the reactant supply to SPE fuel cell stack 5. As depicted, the supplies of the fuel and oxidant reactants are controlled by reactant supply subsystem 10. Subsystem 10 also processes fuel and oxidant raw materials into reactants suitable for use in the fuel cell. For the fuel reactant, a supply of a suitable organic 12 (e.g., methane) is reformed and purified by reformer subsystem 16 into a pressurized hydrogen reactant stream. For the oxidant reactant, ambient air 14 is compressed by compressor 18 into a pressurized oxidant reactant stream. A rate determiner, in this case flowmeter 20, is provided in the hydrogen reactant stream to determine the rate that hydrogen is supplied from the outlet of reformer subsystem 16.

In this embodiment, DC-DC current converter 21 would be controlled in accordance with the actual rate that hydrogen is generated by reformer subsystem 16. This is advantageous since the response of reformer subsystem 16 to sudden changes in the power demanded by external load 3 is relatively slow. For simplicity and illustration purposes in FIG. 1, a rate determiner is not provided in the oxidant reactant stream. The response time of compressor 18 may, for instance, be sufficiently fast compared to the response time of reformer subsystem 16 that controlling on the basis of rate of oxidant reactant processed is not necessary. However, in other embodiments it may be preferable to determine the rate of oxidant processed or perhaps both rates, and then to control converter 21 on this basis instead.

Reactant supply subsystem 10 is itself controlled in accordance with various input signals. An input signal to turn on is provided by signal 30 when main power source 2 is down or if the state of charge of battery 7 is unacceptably low. An input signal indicative of the desired current output from DC-DC current converter 21 is provided as signal 31. An input signal indicative of the actual current output from DC-DC current converter 21 is obtained by ammeter 42 and provided as signal 32. Finally, an input signal indicative of the actual current input to DC-DC current converter 21 is obtained by ammeter 41 and provided as signal 33.

The system in FIG. 1 is also equipped with fuel cell monitor 35 which can monitor cells or groups of cells in the stack (via multiple monitoring signals 36) for potentially damaging voltage reversal conditions or for ground faults. In the event one of these conditions should arise, monitor 35 can signal switch 37 to interrupt the flow of current from stack 5.

The terminals of fuel cell stack 5 are electrically connected across the current inputs 22a and 22b of DC-DC current converter 21. The current outputs 24a and 24b of converter 21 are electrically connected to the terminals of rechargeable storage battery 7. A signal indicative of the hydrogen production rate is provided from flowmeter 20 to converter 21 at 23. Also, a signal of the actual current input to converter 21 is obtained by ammeter 41 and provided as signal 33.

DC-DC current converter 21 electrically isolates stack 5 from storage battery 7 and from the main system ground (denoted C). Preferably, converter 21 efficiently converts the current produced by stack 5 at the stack voltage to current at the voltage of battery 7. Further, this conversion is preferably done with minimal ripple in the converted current. A suitable type of DC-DC current converter for this purpose is a Cuk-type converter (the basic principles of which are illustrated for instance in U.S. Pat. No. 4,184,197, incorporated herein by reference, and which is configured for controlling current rather than voltage).

Current is drawn from stack 5 in accordance with signal inputs 23 and 33 and current control is effectively accomplished by varying the input impedance of converter 21. In a Cuk-type converter where current flow is regulated by pulses applied to the gate drive of a transistor in the input loop, the input impedance may, for example, be controlled by varying the width of these pulses.

Rechargeable storage battery 7 is a high rate battery that is capable of being float charged (e.g., certain Pb acid batteries) and which has enough capacity to meet the electrical demand of external load 3 until the fuel cell side of UPS 1 can take over. Battery 7 is directly connected across the inputs 46a and 46b of inverter 45. Outputs 47a and 47b of inverter 45 connect (in the case of the former, via switch 51) to power outputs 50a and 50b of UPS 1 respectively. The operation of switch 51 is controlled by inverter output signal 53.

UPS 1 is equipped with current determiner 55 for determining the desired output current from DC-DC current converter 21. Current determiner 55 comprises load ammeter 57, battery ammeter 59, charge controller 61, and computing unit 63. Signal 65 is indicative of the charge or discharge current flowing through battery 7 and is provided to charge controller 61 from ammeter 59. Signals 67 and 69 are indicative of the current desired for charging battery 7 and that being drawn by inverter 45 respectively and are provided to computing unit 63 from charge controller 61 and load ammeter 57 respectively. Signal 31 represents the desired output current from DC-DC current converter 21 and is provided by computing unit 63 to reactant supply subsystem 10. Signal 85 is an output signal provided to runswitch 83 from charge controller 61 and is indicative of a low state of charge for battery 7.

As depicted, UPS 1 may also be equipped with charge equalization system 71 and mains charging system 73. Charge equalization system 71 is used to equalize the state-of-charge of individual cells within storage battery 7 and communicates with these individual cells via multiple connections 75. Mains charging system 73 is used to keep battery 7 fully charged (trickle charged) during periods when main power source 2 is providing power and thus when UPS 1 is not in use as backup power. Signal 67 is thus also provided to mains charging system 73 to indicate the current desired to trickle charge battery 7.

Finally, FIG. 1 shows apparatus for detecting problems with main power source 2 and for turning on the fuel cell side of UPS 1. Power detection module 76 detects at 77 if there are problems with the power provided by main power source 2, and if so, provides detection signal 79 to both inverter 45 and to runswitch 83. Module 76 also provides phase synchronization signal 81 to inverter 45.

When main power source 2 is operating normally and storage battery 7 is in a fully charged state, switch 51 connects main power source 2 to external load 3 (as shown). The fuel cell side of the system, including fuel cell stack 5 and reactant supply subsystem 10, is not required therefore and is off. However, the state-of-charge of battery 7 is continuously determined by charge controller 61. Information on battery voltage may be obtained from charge equalization system 71 and information on charge passed may be obtained by integrating the current measured by ammeter 59. Trickle charging may be provided to battery 7 by mains charging system 73 as per signal 67 from charge controller 61. Charge equalization system 71 may be operated continuously to equalize the state-of-charge of individual cells in battery 7.

When a problem arises with main power source 2, it is detected by power detection module 76 and then run signals 79 are provided to runswitch 83 and inverter 45. Phase synchronization signal 81 is also provided to inverter 45. In turn, inverter 45 sends signal 53 to operate switch 51 such that power is directed from storage battery 7, through inverter 45, to external load 3. When runswitch 83 receives a run signal from either signal 79 or 85, it sends a run signal 30 to reactant supply subsystem 10. Subsystem 10 then goes through a warm up sequence and starts to supply processed reactants to fuel cell stack 5. The power needed to operate subsystem 10 and certain other devices may also be obtained from battery 7 or inverter 45 but is not shown in the schematic of FIG. 1.

The demand on the fuel cell side of the system is determined by summing the current demanded from external load 3 and the current required to appropriately recharge storage battery 7. These currents are measured by load ammeter 57 and battery ammeter 59 respectively with representative signals 67 and 69 being sent to computing unit 63. Signal 31, representing the summed current, is then provided to reactant supply subsystem 10.

Subsystem 10 then is directed to process and provide reactants to meet the demand represented by signal 31. However, there is a delay in the time it takes for compressor 18 and particularly for reformer subsystem 16 to produce the desired reactants. Flowmeter 20 therefore determines the actual production rate of hydrogen and, from that, a desired current to be drawn from fuel cell stack 5 (provided by signal 23 to a setpoint input of DC-DC current converter 21). The desired current is generally selected to be that which provides for the most efficient generation of power from the processed reactant supply available. By so doing, inefficient use of reactants and/or inefficient periods of power generation may be avoided while reformer subsystem 16 adjusts to changes in reactant demand.

For purposes of controlling reactant supply subsystem 10 and DC-DC current converter 21, comparison signals (33, 32) representing the actual currents drawn from fuel cell stack 5 and output from converter 21 are provided by ammeters 41 and 42 respectively. As shown, signal 33 is also provided to reactant supply subsystem 10 for instance in case a problem is discovered with fuel cell stack 5 (e.g., a cell voltage reversal or ground fault condition as detected by fuel cell monitor 35) and current flow is interrupted by switch 37. Processed reactants are then being requested (by signal 31) but are not being consumed. In this event, a zero current indication in signal 33 is used to signal a slowdown in reactant production from subsystem 10.

DC-DC current controller 21 thus draws a variable current from fuel cell stack 5 in accordance with the varied rate of hydrogen available from reformer subsystem 16. Increases in current demand from the storage battery side are initially met by storage battery 7 while the fuel cell side of the system catches up, all the while with the fuel cell stack generating power according to reactant supply available. During decreases in current demand from the storage battery side of the system, excess current from converter 21 is used to recharge battery 7. If the decrease in demand is substantial enough that the excess current available exceeds the acceptable recharge rate of the battery, the excess current may be used elsewhere (e.g., a heater) or dumped in order to protect the battery.

When main power source 2 recovers, the return to normal condition is detected by power detection module 76 that in turn signals runswitch 83 and inverter 45 accordingly. The fuel cell side of the system continues to operate if runswitch 83 still receives a low state of charge signal 85. Once battery 7 is fully charged, the fuel cell side of the system is signaled (by 30) to shutdown.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings.

What is claimed is:

1. A power generating system for providing electrical power to an external load, the system comprising a fuel cell having a reactant inlet, a reactant processor for processing a reactant raw material into a reactant stream for the fuel cell, the reactant processor having an inlet for receiving the reactant raw material and an outlet fluidly connected to the reactant inlet of the fuel cell, a rate determiner for determining the rate that reactant is supplied from the reactant processor outlet to the reactant inlet of the fuel cell, a DC-DC current converter having current inputs and current outputs, the fuel cell being electrically connected across the current inputs of the DC-DC current converter, a rechargeable storage battery being electrically connected across the current outputs of the DC-DC current converter, a current determiner for determining a desired output current from the DC-DC current converter, and system power outputs for outputting power to the external load, wherein an output signal from the current determiner is provided as a setpoint input to the reactant processor, and an output signal from the rate determiner is provided as a setpoint input of the DC-DC current converter.

2. The power generating system of claim 1 wherein the rate determiner comprises a reactant rate sensor in the fluid connection between the reactant processor outlet and the reactant inlet of the fuel cell.

3. The power generating system of claim 1 wherein the rate determiner comprises a computing unit for calculating the reactant rate supplied from the reactant processor.

4. The power generating system of claim 1, additionally comprising an inverter wherein the current inputs and outputs of the inverter are electrically connected across the storage battery and the system power outputs, respectively.

5. The power generating system of claim 1 wherein the current determiner comprises:

a load ammeter measuring current directed to the external load;

a battery ammeter measuring current through the storage battery;

a charge controller receiving an input signal from the battery ammeter; and a computing unit receiving input signals from the charge controller and the load ammeter and providing an output signal to a setpoint input of the reactant processor.

6. The power generating system of claim 1 wherein the DC-DC current converter is a Cuk-type converter.

7. The power generating system of claim 6 wherein the DC-DC current converter electrically isolates the fuel cell from the storage battery.

8. The power generating system of claim 1, additionally comprising:

a switch for interrupting current flow to the current inputs of the DC-DC current converter; and a fuel cell monitor connected to the fuel cell and controlling the switch.

9. The power generating system of claim 1, additionally comprising an ammeter measuring the input current to the DC-DC current converter and providing a signal to the DC-DC current converter.

10. The power generating system of claim 9 wherein the ammeter measuring the input current to the DC-DC current converter additionally provides a signal to the reactant processor.

11. The power generating system of claim 1, additionally comprising an ammeter measuring the output current from the DC-DC current converter and providing a signal to the reactant processor.

12. The power generating system of claim 1 wherein the reactant is hydrogen.

13. The power generating system of claim 12 wherein the reactant processor is a reformer system, a pressure swing adsorption system, or a pressure reducer.

14. The power generating system of claim 1 wherein the reactant is oxygen.

15. The power generating system of claim 14 wherein the reactant processor is a compressor or a pressure swing adsorption system.

16. The power generating system of claim 1 wherein the power generating system is an uninterruptible power supply.

17. A method of providing electrical power comprising the steps of providing the power generating system of claim 1 and adjusting the input impedance of the DC-DC current converter in accordance with the signal at the DC-DC current converter setpoint input.

18. The method of claim 17, further comprising the step of adjusting the input impedance such that the reactant is consumed in the fuel cell at a rate proportional to the rate that reactant is supplied from the processor.

19. A method of providing electrical power comprising the steps of providing the power generating system of claim 1 and adjusting the rate at which the reactant processor processes the reactant raw material in accordance with the signal at the reactant processor setpoint input.

20. A method of providing electrical power comprising the steps of providing the power generating system of claim 5 and summing the computing unit input signals from the charge controller and the load ammeter and outputting the sum as the output signal provided to the setpoint input of the reactant processor.

21. A method of providing electrical power comprising the steps of providing the power generating system of claim 8, monitoring the fuel cell with the fuel cell monitor, and opening the switch when a cell reversal or ground fault condition is detected.

22. A method of providing electrical power comprising the step of providing the power generating system of claim 10, wherein the reactant processor is signaled to reduce the reactant processing rate when the signal provided by the ammeter measuring the input current to the DC-DC current converter indicates a current below a threshold value.

* * * * *